(12) United States Patent
Heo

(10) Patent No.: US 8,908,344 B2
(45) Date of Patent: Dec. 9, 2014

(54) OVERHEATING PROTECTION CIRCUIT

(71) Applicant: Samsung Electro-Mechanics Co., Ltd., Suwon, Gyunggi-do (KR)

(72) Inventor: Chang Jae Heo, Gyunggi-do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 125 days.

(21) Appl. No.: 13/758,471

(22) Filed: Feb. 4, 2013

(65) Prior Publication Data

US 2014/0139960 A1 May 22, 2014

(30) Foreign Application Priority Data

Nov. 22, 2012 (KR) .................. 10-2012-0132966

(51) Int. Cl.
 *H02H 3/00* (2006.01)
 *H02H 5/04* (2006.01)
(52) U.S. Cl.
 CPC ..................... *H02H 5/04* (2013.01)
 USPC .......................................................... 361/86
(58) Field of Classification Search
 CPC ..................................................... H02H 5/04
 USPC .......................................................... 361/86
 See application file for complete search history.

(56) References Cited

U.S. PATENT DOCUMENTS

| 5,654,861 | A | 8/1997 | Pennisi |
| 8,451,571 | B2 * | 5/2013 | Imura et al. ............ 361/86 |
| 2002/0149350 | A1 | 10/2002 | Koyasu |

FOREIGN PATENT DOCUMENTS

| JP | 9-246876 | 9/1997 |
| JP | 2002-312044 A | 10/2002 |

OTHER PUBLICATIONS

Office Action Japanese Patent Application No. 2013-020517 dated Dec. 10, 2013.

* cited by examiner

*Primary Examiner* — Rexford Barnie
*Assistant Examiner* — Tien Mai
(74) *Attorney, Agent, or Firm* — McDermott Will & Emery LLP

(57) ABSTRACT

There is provided an overheating protection circuit, including a temperature-variable voltage generating unit generating a temperature-variable voltage by adding a temperature-proportional voltage increasing with an increase in temperature and a first turn-on voltage decreasing with an increase in temperature; and an overheating prevention signal generating unit comparing the temperature-variable voltage and a second turn-on voltage decreasing with an increase in temperature to generate an overheating prevention signal, wherein the first turn-on voltage and the second turn-on voltage have the same distribution.

20 Claims, 8 Drawing Sheets

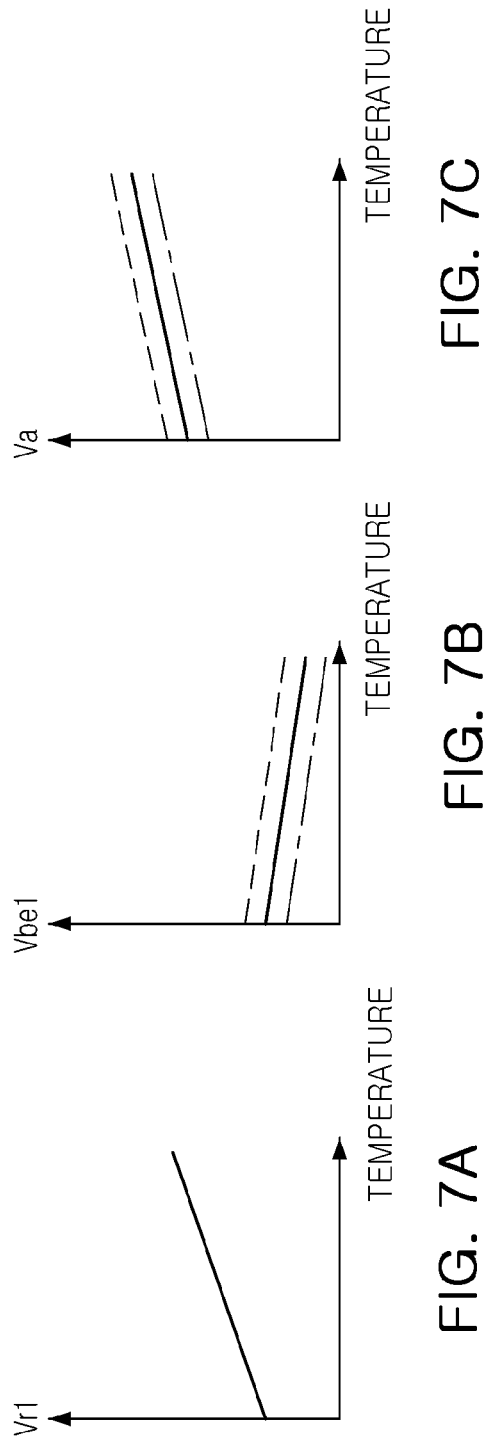

OVERHEATING PROTECTION CIRCUIT

CROSS-REFERENCE TO RELATED APPLICATIONS

This application claims the priority of Korean Patent Application No. 10-2012-0132966 filed on Nov. 22, 2012, in the Korean Intellectual Property Office, the disclosure of which is incorporated herein by reference.

BACKGROUND OF THE INVENTION

1. Field of the Invention

The present invention relates to an overheating protection circuit.

2. Description of the Related Art

An overheating protection circuit is included in a semiconductor integrated circuit and is a circuit for protecting the semiconductor integrated circuit when abnormal overheating occurs. The overheating protection circuit is configured based on negative temperature properties whereby a voltage Vbe between a base and emitter of a bipolar junction transistor (BJT) changes at a rate of −2.2 mV/L with an increase in temperature.

However, an operational temperature of the overheating protection circuit changes according to distribution of the Vbe between the base and emitter of the BJT.

Patent Document 1, the related art document below, discloses a thermal protection circuit but does not disclose technology for maintaining a constant operating temperature that changes according to distribution of a voltage Vbe between a base and emitter of a BJT.

RELATED ART DOCUMENT (Patent Document 1) US Patent Laid-Open Publication No. U.S. Pat. No. 5,654,861

SUMMARY OF THE INVENTION

An aspect of the present invention provides an overheating protection circuit capable of being operated at a constant temperature by compensating for voltage distribution between a base and an emitter by using two bipolar junction transistors (BJTs) having the same voltage distribution between bases and emitters thereof.

According to an aspect of the present invention, there is provided an overheating protection circuit, including: a temperature-variable voltage generating unit generating a temperature-variable voltage by adding a temperature-proportional voltage increasing with an increase in temperature and a first turn-on voltage decreasing with an increase in temperature; and an overheating prevention signal generating unit comparing the temperature-variable voltage and a second turn-on voltage decreasing with an increase in temperature to generate an overheating prevention signal, wherein the first turn-on voltage and the second turn-on voltage have the same distribution.

An increase rate of the temperature-proportional voltage increasing with an increase in temperature may be higher than a decrease rate of the first turn-on voltage decreasing with an increase in temperature.

The temperature-variable voltage generating unit may include a temperature-proportional voltage generating unit detecting a temperature-proportional current having a current amount increasing with an increase in temperature to generate the temperature-proportional voltage; and a distribution correcting unit providing the first turn-on voltage for correcting the distribution of the second turn-on voltage.

The temperature-proportional voltage generating unit may include a first temperature-proportional current source outputting the temperature-proportional current; and a first resistor detecting the temperature-proportional current as the temperature-proportional voltage.

The distribution correcting unit may include a first bipolar junction transistor (BJT) having a collector connected to the temperature-proportional voltage generating unit, a base connected to the collector, and an emitter connected to a ground, wherein the first BJT provides the first turn-on voltage according to a voltage between the emitter of the first BJT and the base of the first BJT.

A decrease rate of the second turn-on voltage decreasing with an increase in temperature may be identical to a decrease rate of the first turn-on voltage decreasing with an increase in temperature.

The overheating prevention signal generating unit may include: a comparator comparing the temperature-variable voltage and the second turn-on voltage; and an inverter generating the overheating prevention signal according to a comparison result of the comparator.

The comparator may include a second temperature-proportional current source generating the same amount of current as a current of the first temperature-proportional current source; and a second BJT having a collector connected to the second temperature-proportional current source, a base having the temperature-variable voltage applied thereto, and an emitter connected to a ground, wherein the second BJT provides the second turn-on voltage according to a voltage between the emitter of the second BJT and the base of the second BJT.

The comparator may further include a bandgap circuit connected between the emitter of the second BJT and the ground and adjusting the second turn-on voltage.

The inverter may include a P-channel field effect transistor having a gate connected to the second temperature-proportional current source and a connection node of the collector of the second BJT, a source having a driving voltage applied thereto, and a drain connected to an output terminal outputting the overheating prevention signal; and a constant current source connected between the drain and ground.

According to another aspect of the present invention, there is provided an overheating protection circuit, including: a temperature-variable voltage generating unit generating a temperature-variable voltage by adding a temperature-proportional voltage increasing with an increase in temperature and a first turn-on voltage decreasing with an increase in temperature; a reference voltage generating unit providing a third turn-on voltage decreasing with an increase in temperature as a reference voltage; and an overheating prevention signal generating unit comparing the temperature-variable voltage and the reference voltage to generate an overheating prevention signal, wherein the first turn-on voltage and the third turn-on voltage have the same distribution.

An increase rate of the temperature-proportional voltage increasing with an increase in temperature may be higher than a decrease rate of the first turn-on voltage decreasing with an increase in temperature.

The temperature-variable voltage generating unit may include a temperature-proportional voltage generating unit detecting a temperature-proportional current having a current amount increasing with an increase in temperature to generate the temperature-proportional voltage; and a distribution correcting unit providing the first turn-on voltage for correcting the distribution of the third turn-on voltage.

The temperature-proportional voltage generating unit may include a first temperature-proportional current source outputting the temperature-proportional current; and a first resistor detecting the temperature-proportional current as the temperature-proportional voltage.

The distribution correcting unit may include a first bipolar junction transistor (BJT) having a collector connected to the temperature-proportional voltage generating unit, a base connected to the collector, and an emitter connected to a ground, wherein the first BJT provides the first turn-on voltage according to a voltage between the emitter of the first BJT and the base of the first BJT.

A decrease rate of the third turn-on voltage decreasing with an increase in temperature may be identical to a decrease rate of the first turn-on voltage decreasing with an increase in temperature.

The reference voltage generating unit may include a third temperature-proportional current source generating current the same amount of current as a current of the first temperature-proportional current source; and a third BJT having a collector connected to the third temperature-proportional current source, a base connected to the collector, and an emitter connected to a ground, wherein the third BJT provides the third turn-on voltage according to a voltage between the emitter of the third BJT and the base of the third BJT.

The comparator may further include a bandgap circuit connected between the emitter of the third BJT and the ground and adjusting the third turn-on voltage.

The overheating prevention signal generating unit may include a comparator outputting the overheating prevention signal when the first turn-on voltage is equal to or higher than the third turn-on voltage.

The comparator may include a non-inverting terminal having the temperature-variable voltage applied thereto, an inverting terminal having the third turn-on voltage applied thereto, and an output terminal outputting the overheating prevention signal.

BRIEF DESCRIPTION OF THE DRAWINGS

The above and other aspects, features and other advantages of the present invention will be more clearly understood from the following detailed description taken in conjunction with the accompanying drawings, in which:

FIGS. 7A, 7B, and 7C are a graph a voltage generated by a temperature-variable voltage generating unit that is one element of an overheating protection circuit according to an embodiment of the present invention;

DETAILED DESCRIPTION OF THE EMBODIMENTS

Figure 1:
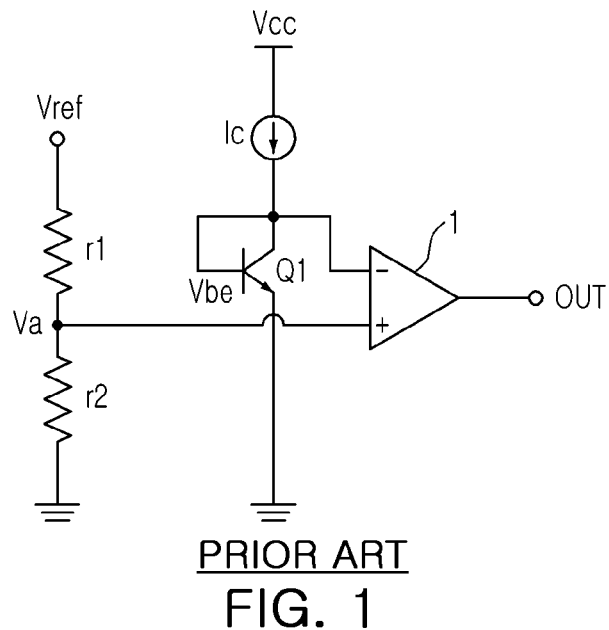
FIG. 1 is a circuit diagram of an example of a general overheating protection circuit.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

FIG. 1 is a circuit diagram of an example of a general overheating protection circuit. A general overheating protection circuit will now be described with reference to FIG. 1. The overheating protection circuit may compare a voltage Va, generated by dividing a reference voltage Vref by a first resistor r1 and a second resistor r2, with a voltage Vbe between a base and emitter of a bipolar junction transistor (BJT) Q1 to generate an anti-overheating signal. In this case, the BJT Q1 may receive constant current output from a constant current source Ic connected to a driving voltage Vcc through a collector. With regard to a comparator 1, the voltage Va may be applied to a non-inverting terminal of the comparator 1 and the voltage Vbe may be applied to an inverting terminal of the comparator 1. Then, when the voltage Va is equal to or higher than the voltage Vbe, the comparator 1 may output an overheating prevention signal to an output terminal. Although not shown in FIG. 1, the reference voltage Vref may be supplied from a bandgap circuit outputting a constant voltage in spite of a change in temperature.

Figure 2A:
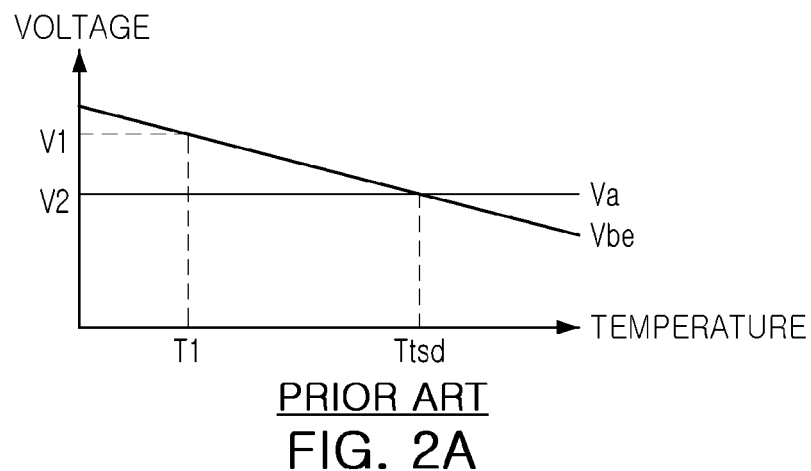
FIGS. 2A and 2B are a graph illustrating a process of generating an anti-overheating signal according to an increase in temperature of the overheating protection circuit of FIG. 1.
Figure 2B:
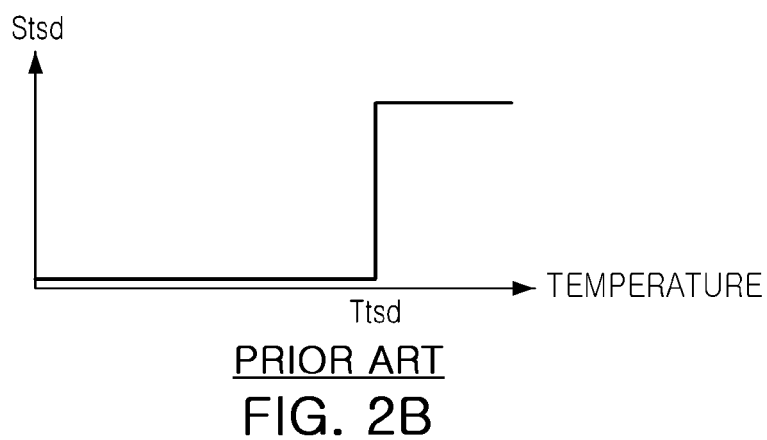

FIG. 2 is a graph illustrating a process of generating an overheating prevention signal Stsd according to an increase in temperature of the overheating protection circuit of FIG. 1. As may be seen from FIG. 2A, the Va is maintained at a second voltage level V2 in accordance with an increase in temperature, but the voltage Vbe decreases according to an increase in temperature due to voltage properties between the base and emitter of the BJT.

The voltage Vbe is a first voltage level V1 at room temperature T1 but decreases at a constant rate with an increase in temperature. Thus, an overheating prevention signal Stsd may be generate at an overheating prevention temperature Ttsd corresponding to a time at which the voltage Va is equal to or higher than the voltage Vbe. As may be seen from FIG. 2B, the overheating prevention signal Stsd is maintained at a low level at a temperature lower than the overheating prevention temperature Ttsd, but is converted to a high level from the overheating prevention temperature Ttsd.

Figure 3:
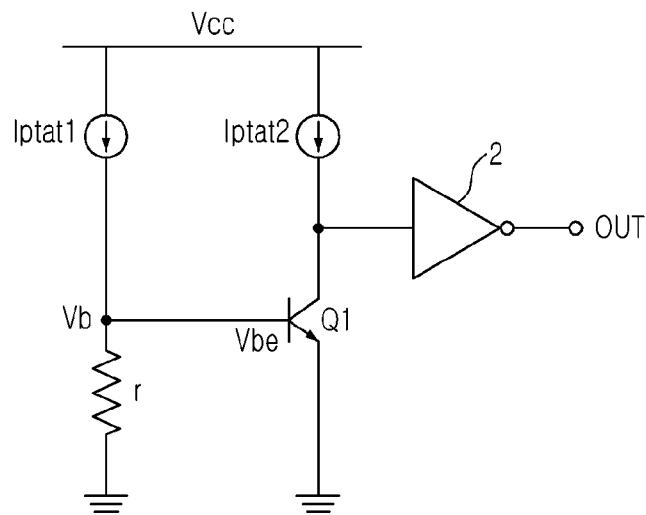
FIG. 3 is a circuit diagram of another example of the general overheating protection circuit.

FIG. 3 is a circuit diagram of another example of the general overheating protection circuit. The example of the general overheating protection circuit will now be described with reference to FIG. 3. First and second temperature-proportional current sources Ipatat1 and Ipatat2 may increase the amount of current in a constant increase rate to output the current according to an increase in temperature. Current output from the first temperature-proportional current source Ipatat1 may be detected as a voltage Vb by a resistor r and may be supplied to a base of the BJT Q1. An emitter of the BJT Q1 may be connected to ground. A collector of the BJT Q1 may receive current from the second temperature-proportional current source Ipatat2. An inverter 2 may be connected to the collector of the BJT Q1 and may output an overheating prevention signal Stsd generated by inverting a voltage of the collector to an output terminal OUT.

Figure 4A:
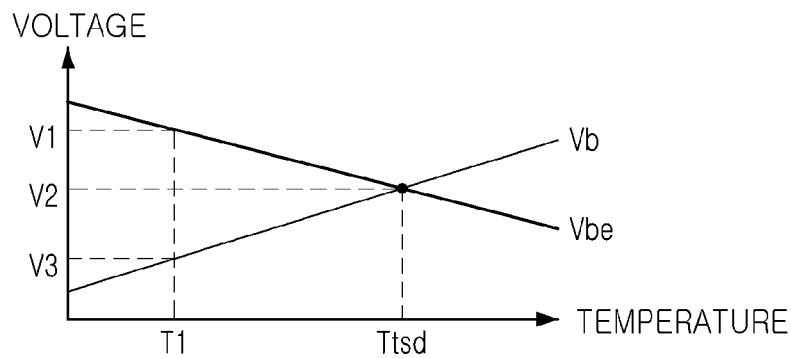
FIGS. 4A and 4B are a graph illustrating a process of generating an anti-overheating signal according to an increase in temperature of the overheating protection circuit of FIG. 3.
Figure 4B:
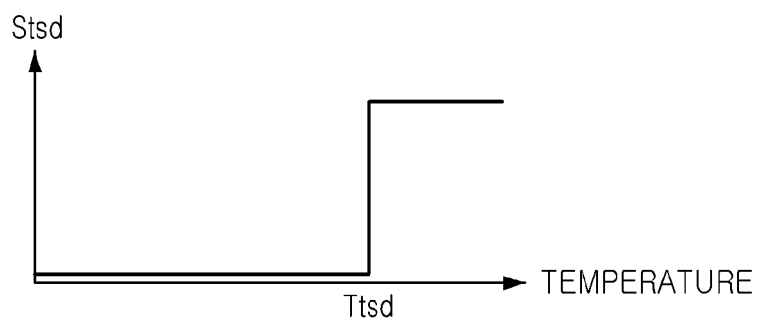

FIG. 4 is a graph illustrating a process of generating the overheating prevention signal Stsd according to an increase in temperature of the overheating protection circuit of FIG. 3.

The voltage Vb is set to be lower than the voltage Vbe between the base and emitter of the BJT Q1 at room temperature T1. Thus, the voltage Vb may be maintained at a third voltage level V3 and the voltage Vbe may be maintained at a first voltage level V1. In this case, the BJT Q1 may not operate. A collector voltage of the BJT Q1 may be maintained at a high level and the overheating prevention signal Stsd obtained by inverting the collector voltage may be maintained at a low level.

However, it may be seen that, as a temperature gradually increases, the amount of current output from a temperature-proportional current source Ipatat1 increases such that the voltage Vb gradually increases, and the voltage Vbe decreases due to the properties of a voltage between the base and emitter of the BJT. As a temperature continually increases, the BJT Q1 is turned on at a voltage level V2 at which the voltage Vb is equal to or higher than the voltage Vbe. In addition, the collector voltage of the BJT Q1 decreases to a low level such that the overheating prevention signal Stsd obtained by inverting the collector voltage may be converted into a high level. That is, the overheating prevention signal Stsd may be generated at the overheating prevention temperature Ttsd corresponding to a time at which the voltage Vb is equal to or higher than the voltage Vbe.

Figure 5A:
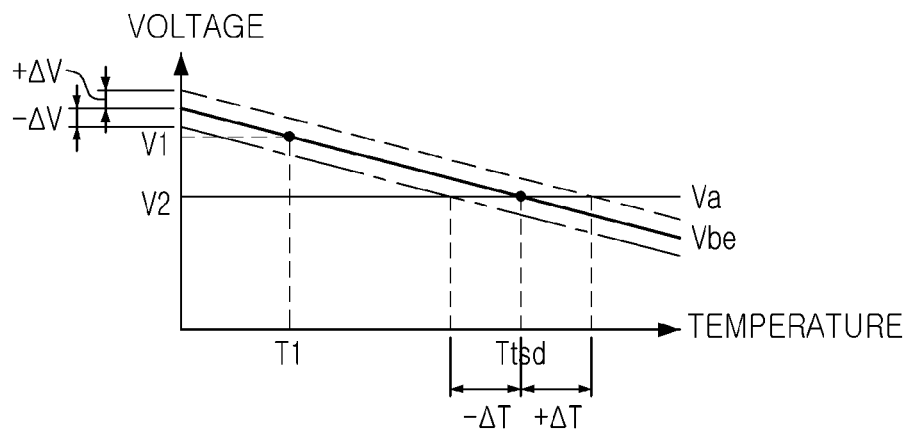
FIGS. 5A and 5B are a graph showing distribution of anti-overheating temperatures according to voltage distribution between a base and an emitter of a BJT shown in FIGS. 1 and 3.
Figure 5B:
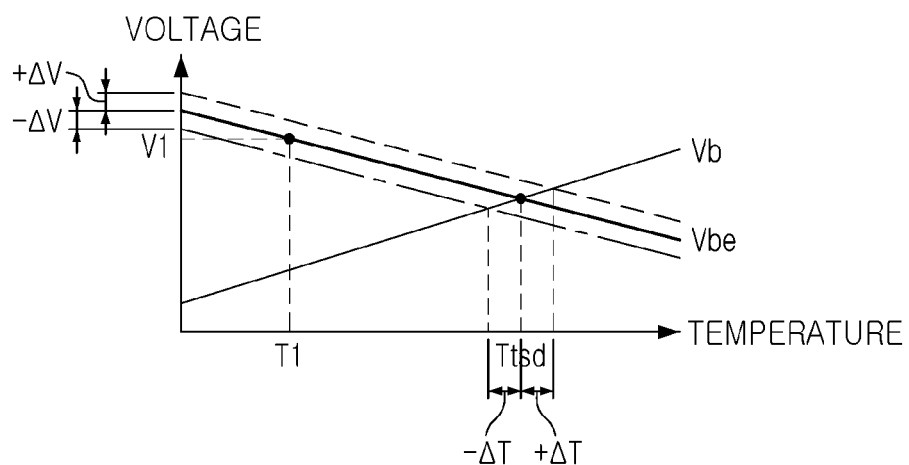

FIG. 5 is a graph showing distribution of the overheating prevention temperature Ttsd according to distribution of the voltages Vbe between a base and an emitter of a BJT shown in FIGS. 1 and 3. FIG. 5A relates to the overheating protection circuit of FIG. 1, and FIG. 5B relates to the overheating protection circuit of FIG. 3.

Referring to FIGS. 2A and 5A, the voltage Vbe shown in FIG. 2A is denoted by a solid line, the voltage Vbe based on positive voltage distribution +ΔV is denoted by a dashed line, and the voltage Vbe based on negative voltage distribution −ΔV is denoted by a dashed dotted line, in FIG. 5A.

As may be seen from FIG. 5A, the voltage Vbe that is not affected by voltage distribution and the voltage Va intersect each other at the overheating prevention temperature Ttsd, but the voltage Vbe that is affected by the positive and negative voltage distribution ±ΔV and the voltage Va intersect each other at a temperature that is different from the overheating prevention temperature Ttsd by a temperature difference ±ΔT, rather than the overheating prevention temperature Ttsd.

Referring to FIGS. 4A and 5B, the voltage Vbe shown in FIG. 4A is denoted by a solid line, the voltage Vbe based on positive voltage distribution +ΔV is denoted by a dashed line, and the voltage Vbe based on negative voltage distribution −ΔV is denoted by a dashed dotted line, in FIG. 5B.

Like in the above description, it may be seen that the voltage Vbe that is affected by the positive and negative voltage distribution ±ΔV and the voltage Vb intersect each other at a temperature that is different from the overheating prevention temperature Ttsd by a temperature difference ±ΔT, instead of the overheating prevention temperature Ttsd.

That is, distribution of the overheating prevention temperature Ttsd at which the overheating prevention signal Stsd is generated may be generated due to distribution of the voltage between the base and emitter of the BJT, thereby affecting the reliability of the overheating protection circuit.

Hereinafter, embodiments of the present invention for overcoming the above-described problems will be described.

Figure 6:
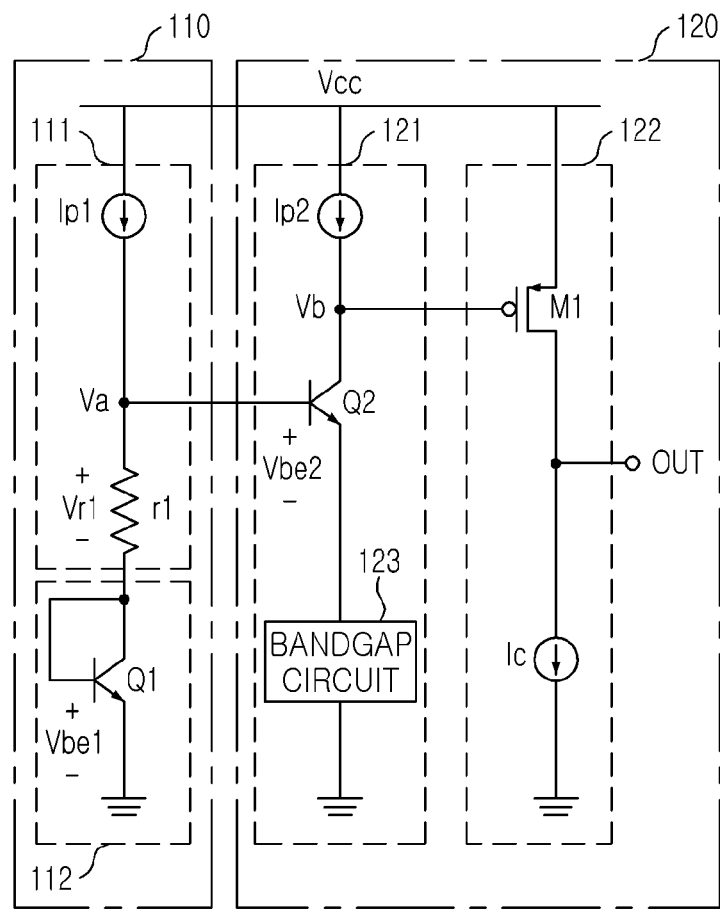
FIG. 6 is a circuit diagram of an overheating protection circuit according to an embodiment of the present invention.

FIG. 6 is a circuit diagram of an overheating protection circuit 10 according to an embodiment of the present invention. The overheating protection circuit 10 may include a temperature-variable voltage generating unit 110 and an overheating prevention signal generating unit 120.

The temperature-variable voltage generating unit 110 may include a temperature-proportional voltage generating unit 111 and a distribution correcting unit 112.

The temperature-proportional voltage generating unit 111 may include a first temperature-proportional current source Ip1 and a first resistor r1. In detail, the first temperature-proportional current source Ip1 may be connected to the driving voltage Vcc to output a temperature-proportional current of which the amount increases with an increase in temperature. The first resistor r1 may detect the temperature-proportional current to generate a temperature-proportional voltage Vr1.

The distribution correcting unit 112 may include a first BJT Q1. A collector of the first BJT Q1 may be connected to the temperature-proportional voltage generating unit 111 and a base of the first BJT Q1 may be connected to the collector, and an emitter of the first BJT Q1 may be connected to ground.

As described above, a voltage Vbe1 between the base and emitter of the first BJT Q1 may decrease with an increase in temperature due to the properties of a transistor.

In this case, the temperature-variable voltage generating unit 110 generates a temperature-variable voltage Va by adding the temperature-proportional voltage Vr1 and the voltage Vbe1 between the base and emitter of the first BJT Q1. In this case, in order to generate the temperature-variable voltage Va that increases with an increase in temperature, an increase rate of the temperature-proportional voltage Vr1 with an increase in temperature may be set to be higher than a decrease rate of the voltage Vbe1 between the base and emitter of the of the first BJT Q1 with increase in temperature.

FIG. 7 is a graph a voltage generated by the temperature-variable voltage generating unit 110 that is one element of an overheating protection circuit according to an embodiment of the present invention.

FIG. 7A relates to the temperature-proportional voltage Vr1, FIG. 7B relates to the voltage Vbe1 between the base and emitter of the first BJT Q1, and FIG. 7C relates to the temperature-variable voltage Va. In FIG. 7B, the voltage Vbe1 that is not affected by voltage distribution is denoted by a solid line, the voltage Vbe1 based on positive voltage distribution is denoted by a dashed line, and the voltage Vbe1 based on negative voltage distribution is denoted by a dashed dotted line.

As may be seen from FIG. 7, the temperature-proportional voltage Vr1 increases with an increase in temperature and the voltage Vbe1 decreases with an increase in temperature. An increase rate of the temperature-proportional voltage Vr1 with an increase in temperature may be set to be higher than a decrease rate of the voltage Vbe1 such that the temperature-variable voltage Va may increase with an increase in temperature. However, it may be seen that the temperature-variable voltage Va may also have distribution due to influence of the distribution of the voltage Vbe1.

Referring back to FIG. 6, the overheating prevention signal generating unit 120 may include a comparator 121 and an inverter 122.

The comparator 121 may include a second temperature-proportional current source Ip2 and a second BJT Q2. In detail, the second temperature-proportional current source Ip2 may be connected to the driving voltage Vcc to output a temperature-proportional current of which the amount increases with an increase in temperature to a collector of the second BJT Q2. In this case, the second temperature-proportional current source Ip2 may generate the same current as current generated from the first temperature-proportional current source Ip1. That is, the first temperature-proportional current source Ip1 and the second temperature-proportional current source Ip2 may generate the same current at the same temperature.

The second BJT Q2 may include a collector connected to the second temperature-proportional current source Ip2, a base having a temperature-variable voltage applied thereto, and an emitter connected to ground. The second BJT Q2 is manufactured by the same process as the first BJT Q1 such that the voltage Vbe1 between the base and emitter of the first BJT Q1 and a voltage Vbe2 between the base and emitter of the second BJT Q2 may have the same distribution. The voltage Vbe1 and the voltage Vbe2 may decrease with the same decrease rate with an increase in temperature due to the properties of a transistor.

In addition, the comparator 121 may further include a bandgap circuit 123 for outputting a constant voltage in spite of a changed in temperature.

The bandgap circuit 123 is connected between the emitter of the second BJT Q2 and ground such that the voltage Vbe 2 may be adjusted to be higher than the temperature-variable voltage Va at room temperature.

When the temperature-variable voltage Va is less than the voltage Vbe 2, a high voltage is applied to a node connected to a collector of the second BJT Q2. When the temperature-variable voltage Va is equal to or higher than the voltage Vbe 2, a low voltage may be applied to the node connected to the collector of the second BJT Q2. That is, the comparator 121 may compare the temperature-variable voltage Va and the voltage Vbe2 to generate outputs having high/low levels.

The inverter 122 may invert the comparison result of the comparator 121 to output the overheating prevention signal Ttsd to an output terminal OUT. In detail, the inverter 122 may include a P-channel field effect transistor including a gate connected to the second temperature-proportional current source Ip2 and a connection node of the collector, a source supplied with a driving voltage, and a drain connected to a output terminal for outputting the overheating prevention signal Stsd, and a constant current source connected between the drain and ground. When a low voltage is applied to the second BJT Q2, the P-channel field effect transistor may be turned on to output the overheating prevention signal Stsd via the output terminal thereof.

Figure 8A:
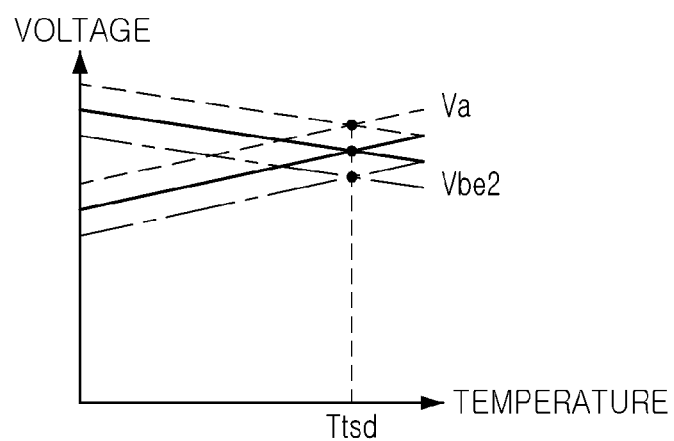
FIGS. 8A and 8B are a graph illustrating a process of generating a anti-overheating signal according to an increase in temperature of the overheating protection circuit of FIG. 6.
Figure 8B:
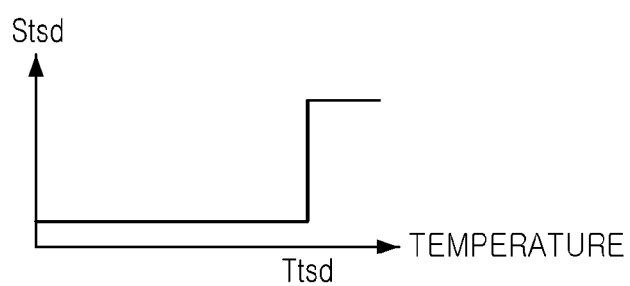

FIG. 8 is a graph illustrating a process of generating the overheating prevention signal Stsd according to an increase in temperature of the overheating protection circuit 10 of FIG. 6.

As may be seen from FIG. 8A, with regard to the voltage Vbe2, the first BJT Q1 and the second BJT Q2 are manufactured by the same process such that the voltage Vbe2 and the voltage Vbe1 may have the same distribution.

As may be seen from FIG. 8A and (b), although the voltage Vbe2 has distribution, the distribution is offset by the voltage Vbe1, and the overheating prevention temperature Ttsd and the voltage Vbe2 always intersect each other at the overheating prevention temperature Ttsd to generate the overheating prevention signal Stsd.

That is, the distribution of the voltage Vbe2 is compensated for by the distribution of the voltage Vbe1, thereby performing a reliable operation of the overheating protection circuit 10.

Figure 9:
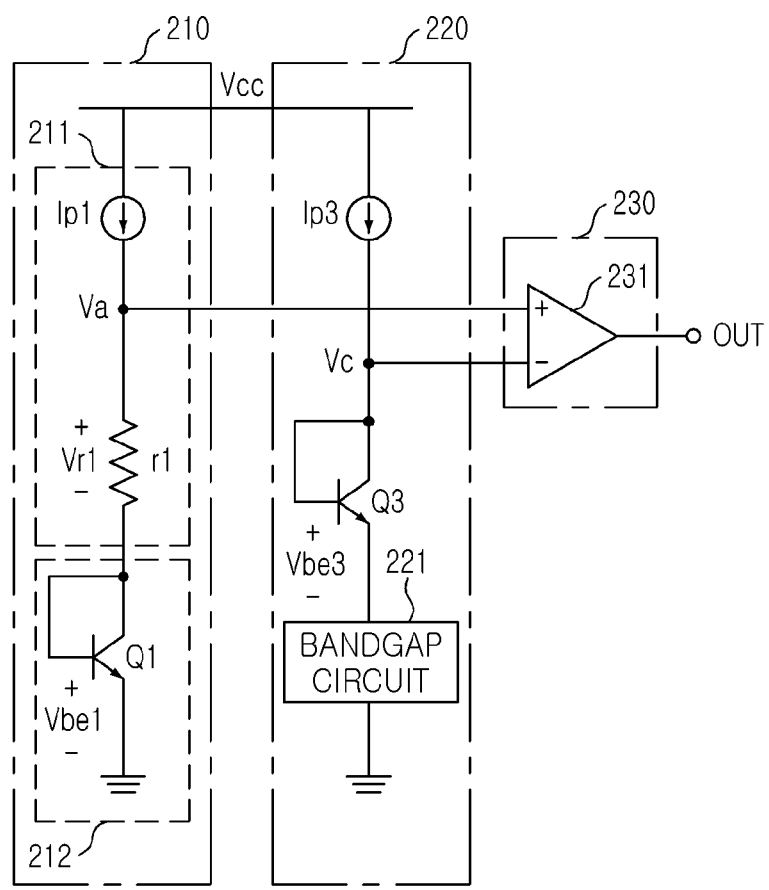
FIG. 9 is a circuit diagram of an overheating protection circuit according to an embodiment of the present invention.

FIG. 9 is a circuit diagram of an overheating protection circuit 20 according to an embodiment of the present invention. The overheating protection circuit 20 may include a temperature variable voltage generating unit 210, a reference voltage generating unit 220, and an overheating prevention signal generating unit 230.

The temperature variable voltage generating unit 210 of FIG. 9 has a similar configuration and function to those of the temperature-variable voltage generating unit 110 of FIG. 6, and thus, a detailed description thereof is not described.

The reference voltage generating unit 220 may include a third temperature-proportional current source Ip3 and a third BJT Q3. In detail, the third temperature-proportional current source Ip3 may be connected to a driving voltage Vcc and may output a temperature-proportional current of which a current amount increases with an increase of temperature to a collector of the third BJT Q3. In this case, the third temperature-proportional current source Ip3 may generate the same current as a current of the first temperature-proportional current source Ip1. That is, the first temperature-proportional current source Ip1 and the third temperature-proportional current source Ip3 may generate the same current at the same temperature.

The third BJT Q3 may include the collector connected to the third temperature-proportional power source Ip3, a base connected to the collector, and an emitter connected to ground. The third BJT Q3 and the first BJT Q1 are manufactured by the same process, and thus, the voltage Vbe1 between the base and emitter of the first BJT Q1 and a voltage Vbe3 between the base and emitter of the third BJT Q3 may have the same distribution. In addition, the voltage Vbe1 and the voltage Vbe3 may decrease at the same decrease rate with an increase in temperature due to the properties of a transistor.

In addition, the reference voltage generating unit 220 may further include a bandgap circuit 221 for outputting a constant voltage in spite of a change in temperature.

The bandgap circuit 221 may be connected between the emitter of the third BJT Q3 and ground and may generate a voltage Vc by adjusting the voltage Vbe3 to be maintained at a higher level than the temperature-variable voltage Va at room temperature. In this case, the voltage Vc is obtained by simply shifting the voltage Vbe3 by as much as a predetermined level to be higher than the temperature-variable voltage Va at room temperature, and thus, may have the same distribution of the voltage Vbe3.

The overheating prevention signal generating unit 230 may compare the temperature-variable voltage Va and the voltage Vbe3 and output the overheating prevention signal Stsd to an output terminal OUT according to the comparison result. In detail, when the temperature-variable voltage Va is compared with the voltage Vbe3, if the temperature-variable voltage Va is equal to or higher than the voltage Vbe3, the overheating prevention signal generating unit 230 may output the overheating prevention signal Stsd.

The overheating prevention signal generating unit 230 may include a comparator 231 having a non-inverting terminal to which the temperature-variable voltage Va is applied, an inverting terminal to which the voltage Vbe3 is applied, and an output terminal from which the overheating prevention signal Stsd is output.

Figure 10A:
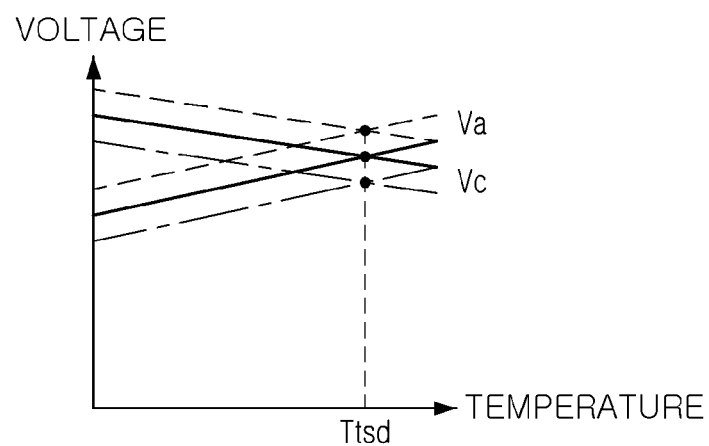
FIGS. 10A and 10B are a graph illustrating a process of generating an anti-overheating signal according to an increase in temperature of the overheating protection circuit of FIG. 9.
Figure 10B:
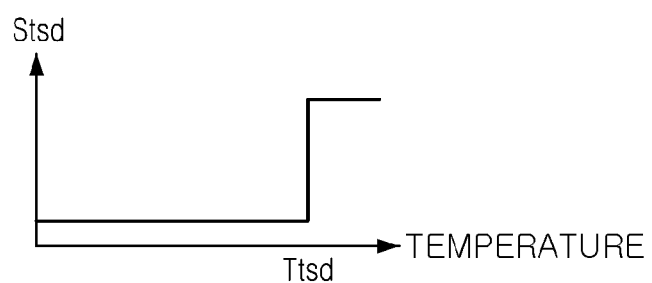

FIG. 10 is a graph illustrating a process of generating the overheating prevention signal Stsd according to an increase in temperature of the overheating protection circuit 20 of FIG. 9.

The first BJT Q1 and the third BJT Q3 are manufactured by the same process. Thus, the voltage Vbe3 and the voltage Vbe1 have the same distribution. Accordingly, it may be seen that the voltage Vc also has the same distribution of the voltage Vbe1.

Referring to FIG. 10A and (b), although the voltage Vc has distribution, the distribution is offset by the voltage Vbe1, and the temperature-variable voltage Va and the voltage Vc always intersect each other at the overheating prevention temperature Ttsd to generate the overheating prevention signal Stsd.

That is, the distribution of the voltage Vbe3 is compensated for by the distribution of the voltage Vbe1, thereby performing a reliable operation of the overheating protection circuit 20.

As set forth above, according to the embodiments of the present invention, voltage distribution between a base and an emitter is offset by using two bipolar BJTs of which voltages between bases and emitters have the same distribution, thereby increasing the reliability of an operation of an overheating protection circuit.

While the present invention has been shown and described in connection with the embodiments, it will be apparent to those skilled in the art that modifications and variations can be made without departing from the spirit and scope of the invention as defined by the appended claims.

What is claimed is:

1. An overheating protection circuit, comprising:
a temperature-variable voltage generating unit generating a temperature-variable voltage by adding a temperature-proportional voltage increasing with an increase in temperature and a first turn-on voltage decreasing with an increase in temperature; and
an overheating prevention signal generating unit comparing the temperature-variable voltage and a second turn-on voltage decreasing with an increase in temperature to generate an overheating prevention signal,
wherein the first turn-on voltage and the second turn-on voltage have the same pattern of base-emitter voltage dependency on the temperature.

2. The overheating protection circuit of claim 1, wherein an increase rate of the temperature-proportional voltage increasing with an increase in temperature is higher than a decrease rate of the first turn-on voltage decreasing with an increase in temperature.

3. The overheating protection circuit of claim 2, wherein the temperature-variable voltage generating unit includes:
a temperature-proportional voltage generating unit detecting a temperature-proportional current having a current amount increasing with an increase in temperature to generate the temperature-proportional voltage; and
a distribution correcting unit providing the first turn-on voltage for correcting a base-emitter voltage of the second turn-on voltage.

4. The overheating protection circuit of claim 3, wherein the temperature-proportional voltage generating unit includes:
a first temperature-proportional current source outputting the temperature-proportional current; and
a first resistor detecting the temperature-proportional current as the temperature-proportional voltage.

5. The overheating protection circuit of claim 3, wherein the distribution correcting unit includes a first bipolar junction transistor (BJT) having a collector connected to the temperature-proportional voltage generating unit, a base connected to the collector, and an emitter connected to a ground,
wherein the first BJT provides the first turn-on voltage according to a voltage between the emitter of the first BJT and the base of the first BJT.

6. The overheating protection circuit of claim 1, wherein a decrease rate of the second turn-on voltage decreasing with an increase in temperature is identical to a decrease rate of the first turn-on voltage decreasing with an increase in temperature.

7. The overheating protection circuit of claim 4, wherein the overheating prevention signal generating unit includes:
a comparator comparing the temperature-variable voltage and the second turn-on voltage; and
an inverter generating the overheating prevention signal according to a comparison result of the comparator.

8. The overheating protection circuit of claim 7, wherein the comparator includes:
a second temperature-proportional current source generating the same amount of current as a current of the first temperature-proportional current source; and
a second BJT having a collector connected to the second temperature-proportional current source, a base having the temperature-variable voltage applied thereto, and an emitter connected to a ground,
wherein the second BJT provides the second turn-on voltage according to a voltage between the emitter of the second BJT and the base of the second BJT.

9. The overheating protection circuit of claim 8, wherein the comparator further includes a bandgap circuit connected between the emitter of the second BJT and the ground and adjusting the second turn-on voltage.

10. The overheating protection circuit of claim 8, wherein the inverter includes:
a P-channel field effect transistor having a gate connected to the second temperature-proportional current source and a connection node of the collector of the second BJT, a source having a driving voltage applied thereto, and a drain connected to an output terminal outputting the overheating prevention signal; and
a constant current source connected between the drain and ground.

11. An overheating protection circuit, comprising:
a temperature-variable voltage generating unit generating a temperature-variable voltage by adding a temperature-proportional voltage increasing with an increase in temperature and a first turn-on voltage decreasing with an increase in temperature;
a reference voltage generating unit providing a second turn-on voltage decreasing with an increase in temperature as a reference voltage; and
an overheating prevention signal generating unit comparing the temperature-variable voltage and the reference voltage to generate an overheating prevention signal,
wherein the first turn-on voltage and the second turn-on voltage have the same pattern of base-emitter voltage dependency on the temperature.

12. The overheating protection circuit of claim 11, wherein an increase rate of the temperature-proportional voltage increasing with an increase in temperature is higher than a decrease rate of the first turn-on voltage decreasing with an increase in temperature.

13. The overheating protection circuit of claim 12, wherein the temperature-variable voltage generating unit includes:
a temperature-proportional voltage generating unit detecting a temperature-proportional current having a current amount increasing with an increase in temperature to generate the temperature-proportional voltage; and a distribution correcting unit providing the first turn-on voltage for correcting a base-emitter voltage of the second turn-on voltage.

14. The overheating protection circuit of claim 13, wherein the temperature-proportional voltage generating unit includes:

a first temperature-proportional current source outputting the temperature-proportional current; and a first resistor detecting the temperature-proportional current as the temperature-proportional voltage.

15. The overheating protection circuit of claim 13, wherein the distribution correcting unit includes a first bipolar junction transistor (BJT) having a collector connected to the temperature-proportional voltage generating unit, abase connected to the collector, and an emitter connected to a ground, wherein the first BJT provides the first turn-on voltage according to a voltage between the emitter of the first BJT and the base of the first BJT.

16. The overheating protection circuit of claim 11, wherein a decrease rate of the second turn-on voltage decreasing with an increase in temperature is identical to a decrease rate of the first turn-on voltage decreasing with an increase in temperature.

17. The overheating protection circuit of claim 14, wherein the reference voltage generating unit includes:

a second temperature-proportional current source generating current the same amount of current as a current of the first temperature-proportional current source; and a first BJT having a collector connected to the second temperature-proportional current source, a base connected to the collector, and an emitter connected to a ground, wherein the first BJT provides the third turn-on voltage according to a voltage between the emitter of the first BJT and the base of the first BJT.

18. The overheating protection circuit of claim 17, wherein the reference voltage generating unit further includes a bandgap circuit connected between the emitter of the first BJT and the ground and adjusting the second turn-on voltage.

19. The overheating protection circuit of claim 11, wherein the overheating prevention signal generating unit includes a comparator outputting the overheating prevention signal when the first turn-on voltage is equal to or higher than the second turn-on voltage.

20. The overheating protection circuit of claim 19, wherein the comparator includes a non-inverting terminal having the temperature-variable voltage applied thereto, an inverting terminal having the second turn-on voltage applied thereto, and an output terminal outputting the overheating prevention signal.

* * * * *